United States Patent Office 2,764,576
Patented Sept. 25, 1956

2,764,576
PREPARATION OF WATER-SOLUBLE SULFONATED STYRENE POLYMERS

Bruno Blaser, Dusseldorf-Urdenbach, Malte Rugenstein, Dusseldorf-Holthausen, and Guenther Tischbirek, Dusseldorf-Benrath, Germany, assignors to Henkel & Cie., G. m. b. H., Dusseldorf-Holthausen, Germany, a corporation of Germany No Drawing. Application July 14, 1953,
Serial No. 367,974

Claims priority, application Germany July 24, 1952

10 Claims. (Cl. 260—79.3)

This invention relates to and has as its object the preparation of water-soluble sulfonated styrene polymers.

In accordance with the invention, water-soluble sulfonation products of styrene polymers are obtained by reacting a solution of the polymer in an aliphatic halogen hydrocarbon with an addition compound of sulfur trioxide with a ketone, and preferably a low-molecular weight ketone.

The styrene polymers which may be used as the starting material include both polystyrene itself and its co-polymers, as, for example, co-polymers with acrylonitrile. In co-polymers, the styrene-component should be present in an amount of at least 30 mol-percent.

As the ketones which may be used in forming the addition compound with sulfur trioxide, those containing 3–4 carbon atoms in their molecule, e. g. acetone, and methyl-ethyl ketone are preferable.

In order to prepare the addition compound which is used as the sulfonating agent, sulfur trioxide is caused to act on the ketone. The molecular ratio of ketone to sulfur trioxide is preferably between 2:1 and 1:3. The formation of the addition compound is exothermic, and the mixing of the reaction causes the generation of heat. It is, therefore, advisable to precool the individual components and/or to provide cooling when the same are mixed together. The formation of this addition compound may be effected at temperatures from −40° C. to +30° C., preferably from −20° C. to −10° C. Furthermore, it is advisable to effect this mixing in the presence of inert solvents. Inert solvents are chlorinated hydrocarbons, containing in their molecule 2–3 carbon atoms and at least one chlorine atom. The upper limit for the number of chlorine atoms in the molecule is given by the melting point of the chlorinated hydrocarbons. The melting point of the solvents or mixtures of different solvents should be in such a range, that the solvents remain in a fluid state at all working temperatures given below. Suitable solvents are, for example, ethylene chloride, trichlorethylene and tetrachlorethylene.

The solution of the styrene polymer in the aliphatic halogen hydrocarbons described above, is then added to the addition compound formed as the sulfonating agent. The molar ratio of total sulfur trioxide: monomeric members in the styrene polymer should be in the range of 1:1 to 2:1. Inasmuch as the styrene polymer precipitates out of the solution at the moment of the addition, an extensive sulfonation is obtained by bringing the reactants together in the sequence described. The addition of the styrene polymer is also preferably effected with cooling to a temperature below 0° C., and preferably from −10° to −40° C. When the reaction mix is heated by the generated heat of reaction, it should be cooled down to temperatures below +5° C., preferably below 0° C. The viscosity of the solutions obtained from these polystyrene sulfonic acids may be considerably increased by heating the sulfonation mixtures to temperatures above 0° C. and preferably to temperatures of 20–50° C.

The solvent mixture may be filtered off from the precipitated polystyrene sulfonic acid and may be recycled after being worked up, as, for example, by distillation.

The polystyrene sulfonic acid may be neutralized by anorganic or organic bases e. g. NaOH, KOH, NH$_4$OH, primary, secondary or tertiary organic amines or alkylolamines containing 1–6 carbon atoms in their molecule. These salts are soluble in water and are excellently suited for use as thickeners, stabilizers for emulsions, additions to adhesives etc.

The following examples are given by way of illustration and not limitation:

Example 1

58 grams (1 mol) acetone are cooled together with 2500 cc. ethylene chloride to about −20° C. and 140 grams (1.75 mol) liquid SO$_3$ is added, drop by drop, into this mixture with agitation. A large amount of heat of reaction is given off. After again cooling to −20° C., a solution of 104 grams of a polystyrene having a molecular weight of 180,000 in 1000 cc. ethylene chloride which was not previously cooled is added. The sulfonic acid precipitates instantly with a reddish color. This color gradually fades away upon further agitation, and the sulfonic acid formed is practically white. It is now agitated for some time with cooling and then agitated for ½ hour at room temperature. The sulfonic acid is then sharply removed by suction filtering. The product is soluble in water, forming a clear solution. The small residues of adhering solvent can be removed by heating.

Example 2

22 grams (about 0.375 mol) acetone and 1500 cc. ethylene chloride are cooled to −20° C. and a solution of 100 grams (1.25 mol) SO$_3$ in 1000 cc. ethylene chloride is added, drop by drop. A solution of 104 grams of a polystyrene having a molecular weight of 180,000 in 1000 cc. ethylene chloride is then added to the sulfonation mixture. The sulfonic acid precipitates immediately. The reaction batch is stirred for some time in the cold and then for ½ hour at room temperature, ½ hour at 35° and ½ hour at 50° C., whereupon the sulfonic acid is finally removed by strong suction filtering. A 1% solution of the acid in water has a viscosity of 400 cps.

Example 3

22 grams (about 0.375 mol) acetone are cooled together with 2500 cc. ethylene chloride to about −20° C., and 100 grams (1.25 mol) SO$_3$ are added, drop by drop, to the mixture. The solution is again cooled, and thereupon there are added to it 104 grams of a polystyrene having a molecular weight of 800,000 dissolved in 2000 cc. ethylene chloride. The mixture is stirred for ¼ of an hour in the cold, and ½ hour at 20° C., ½ hour at 35° C., and ½ hour at 50° C., whereupon the sulfonic acid is removed by strong suction filtering and dissolved in water. A sodium hydroxide solution is then added until a clear alkaline reaction is obtained and the sodium salt is thereupon precipitated with methyl alcohol and dried. A 1% solution of the sodium salt has a viscosity of 600 cps.

Example 4

27 grams (about 0.375 mol) methyl-ethyl-ketone are cooled together with 2500 cc. ethylene chloride to −20° C. 100 grams (1.25 mol) SO$_3$ are added, drop by drop, to this mixture. This sulfonation mixture is again cooled, and there is then added to it the solution of 104 grams of a polystyrene having a molecular weight of 180,000 in 1000 cc. ethylene chloride. After stirring for one hour, the practically white, finely-granular polystyrene sulfonic acid forms a clear solution in water.

*Example 5*

52 grams of a co-polymer of styrene and acrylonitrile (1:1) are dissolved in 2000 cc. ethylene chloride and the solution is introduced at —20° C. into a sulfonation mixture consisting of 2500 cc. ethylene chloride, 22 grams (about 0.375 mol) acetone and 100 grams (1.25 mol) sulfur trioxide which has been prepared in the manner described above, whereupon it is stirred for ½ hour at room temperature and ½ hour at 50° C. The sulfonic acid of the co-polymer which is filtered off by strong suction filtering is gray like the initial product and is readily soluble in water.

We claim:

1. Method for the preparation of water-soluble sulfonated styrene polymers, which comprises contacting a solution of a styrene polymer in an aliphatic halogenated hydrocarbon with a sulfur trioxide-ketone compound, said solution of styrene polymer and said sulfur trioxide-ketone compound being present in amount sufficient to form a ratio of total sulfur trioxide to monomeric members in the styrene polymer of 1:1 to 2:1, said sulfur trioxide-ketone compound being formed by mixing a low-molecular weight, saturated ketone with sulfur trioxide in the molecular ratio of about 2:1 to 1:3 with cooling, and recovering the sulfonated styrene polymer.

2. Method according to claim 1, in which said sulfur trioxide-ketone compound is formed at a temperature of from —40° C. to +30° C.

3. Method according to claim 2, in which said sulfur trioxide-ketone compound is formed at a temperature of from —20° C. to +10° C.

4. Method according to claim 1, in which said ketone is selected from the group consisting of acetone and methylethyl ketone.

5. Method according to claim 1, in which said mixing is effected in the presence of an inert solvent.

6. Method according to claim 1, in which said contacting is effected at a temperature below 0° C.

7. Method according to claim 6, in which said contacting is effected at a temperature of —10 to —40° C.

8. Method according to claim 1, in which said contacting is effected at a temperature below 0° C. and which includes heating the sulfonated mixture obtained to a temperature above 0° C.

9. Method according to claim 8, in which said heating is effected to a temperature of 20—50° C.

10. Method according to claim 1, in which said aliphatic halogenated hydrocarbon is ethylene chloride.

References Cited in the file of this patent
UNITED STATES PATENTS 2,663,700  Roth _____ Dec. 22, 1953